United States Patent
Greaves, Jr.

[19]

[11] Patent Number: 6,152,544
[45] Date of Patent: Nov. 28, 2000

[54] REMOTE BRAKING APPARATUS AND METHOD

[76] Inventor: John C. Greaves, Jr., 190 Wilson Blvd. North, Naples, Fla. 34120-2073

[21] Appl. No.: 09/071,400

[22] Filed: May 1, 1998

Related U.S. Application Data

[60] Provisional application No. 60/068,133, Dec. 15, 1997.

[51] Int. Cl.⁷ ....................................................... B60T 7/02
[52] U.S. Cl. ........................... 303/7; 188/112 R; 188/3 H
[58] Field of Search .................................. 188/356, 357, 188/345, 112 R, 3 H; 303/7

[56] References Cited

U.S. PATENT DOCUMENTS

| | | | |
|---|---|---|---|
| 2,064,612 | 12/1936 | Kliesrath et al. | 188/356 |
| 3,425,221 | 2/1969 | Canfield | 188/356 |
| 3,790,807 | 2/1974 | Rossigno | 303/7 |
| 3,856,632 | 12/1974 | Howard | 303/7 |
| 3,983,787 | 10/1976 | Hendrickson | 303/7 |
| 5,031,729 | 7/1991 | Wittkop et al. | 188/3 H |
| 5,213,396 | 5/1993 | Avery et al. | 303/7 |
| 5,411,321 | 5/1995 | Harness | 303/7 |
| 5,431,253 | 7/1995 | Hargrove | 188/3 H |
| 5,465,813 | 11/1995 | Lichter | 188/3 H |
| 5,503,468 | 4/1996 | Saffran | 188/3 H |

*Primary Examiner*—Matthew C. Graham
*Attorney, Agent, or Firm*—Eric Karich

[57] ABSTRACT

A remote braking apparatus has a vacuum conduit network that operably connects a vacuum source to both the power boost of the towed-vehicle and a pair of solenoid valves. A vacuum cylinder receives vacuum from the solenoid valves as directed by an electronic circuit connected to the vehicle's battery. The vacuum actuates the vacuum cylinder causing it to move between a resting position and a braking position. A cable mechanically interconnects the vacuum cylinder and a brake pedal of the towed-vehicle. The cable passes through a cable shield tube that is anchored to both the vacuum cylinder and the firewall of the vehicle, thereby directing the movement of the vacuum cylinder to the brake pedal, allowing the vacuum cylinder to control the movement of the brake pedal. In response to a signal from the electronic circuit, the solenoid valves direct vacuum into the vacuum cylinder, causing it to move from the resting position to the braking position, pulling the brake pedal and applying the brakes of the towed-vehicle.

14 Claims, 5 Drawing Sheets

REMOTE BRAKING APPARATUS AND METHOD

This application for a utility patent follows a previously filed provisional patent having the serial number 60/068,133 and a filing date of Dec. 15, 1997.

BACKGROUND OF THE INVENTION

1. Field of the Invention

This invention relates generally to a device for applying the brakes of a vehicle by unconventional triggering devices, and more particularly to a vacuum system that both powers the vehicle's power boost and actuates a vacuum cylinder, installed under the hood of the vehicle, to apply the vehicle's brakes upon receipt of a signal generated by a triggering device.

2. Description of Related Art

Remote braking devices, in general, are known in the industry. As described in the following references, it is known in the art to actuate a pneumatic cylinder with pressurized air to remotely trigger the brakes of a towed vehicle. It is not known, however, that a greatly improved remote braking device can be devised using vacuum to actuate the braking device rather than the air pressure that is commonly used. The following art defines the present state of this field:

Wittkop et al., U.S. Pat. No. 5,031,729 describes a remote braking apparatus that applies the brakes of a towed vehicle in response to braking of the towing vehicle. An air compressor driven by the motor of the towing vehicle supplies compressed air to a compressed air storage tank with a pneumatic line extending from the compressed air storage tank rearwardly to a braking assembly which is positioned in the passenger compartment of the towed vehicle. The braking assembly is adjustable and includes a rod positioned between the steering wheel and the brake pedal of the towed vehicle and is secured to both. A pneumatic control device is connected to the pneumatic line to receive a signal therethrough to actuate the braking assembly through an actuation device such as a pneumatic piston to exert pressure to expand the length of the bar and apply the brakes of the towed vehicle. An air release valve in the bar assembly can exhaust air from the pneumatic piston responsive to cessation of compressed air being supplied through the pneumatic line to facilitate immediate release of the brakes of the towed vehicle.

Rossigno, U.S. Pat. No. 3,790,807 describes a solenoid operated control valve for establishing an operational pressure differential in a servomotor located in a trailer to activate the wheel brakes of the trailer in response to an operational electrical signal derived from corresponding hydraulic actuation of the wheel brakes of a tow vehicle.

Lichter, U.S. Pat. No. 5,465,813 describes a device for applying the brake of a towed vehicle when towed by a towing vehicle equipped with an air brake system having a power brake operator operative to supply operating air under pressure to apply a brake on the towing vehicle and also having a reservoir of operating air under pressure. The device is connected to the brake pedal of the towed vehicle. It comprises a first piston-cylinder assembly with a spring for urging the piston therein to an advanced position, and a second piston-cylinder assembly having a spring urging the piston therein to a retracted position. The brake on the towed vehicle is applied only when one of the pistons is advanced. An air line supplies air from the reservoir to the first piston-cylinder assembly to urge the piston to a retracted position against the action of the spring. The brake of the towed vehicle is applied when the piston in the first piston-cylinder assembly is moved to an advanced position by the spring therein in response to a loss of pressure in the reservoir. The brake of the towed vehicle is also applied when the piston in the second piston-cylinder assembly is moved against the spring force to its advanced position by operating air under pressure from the power brake operator when the power brake operator applies the brakes of the towing vehicle.

Avery et al., U.S. Pat. No. 5,213,396 describes a towed motor vehicle brake integrated between a towing and a towed vehicle, capable of apply the brakes of the towed vehicle. The structure of a towing hitch linkage deflects somewhat when it experiences tension or compression. A sensing device, preferably consisting of a hydraulic cylinder and an attached activating rod, grounded to a rotating lever connecting to the towed vehicle, senses compression of the deflecting portion of the linkage and activates the brakes of the towed vehicle to reduce the compressive forces. The tow brake requires no modification of the towed vehicle except allowing an interface with the towed vehicle's braking system. This provides flexibility of use with a variety of towed vehicles and ease of attachment and detachment.

Harness, U.S. Pat. No. 5,411,321 describes a system for selectively applying the brakes of a towed vehicle by controls in the towing vehicle; the system including a portable air compressor and a pneumatic cylinder that can be rapidly installed by attaching to a support structure on the floor of the driver's cockpit in the towed vehicle; the piston of the cylinder being attached to the brake pedal; and a three-way solenoid valve to permit or not to permit the admission of compressed air to the cylinder.

Hargrove, U.S. Pat. No. 5,431,253 describes a braking system for use on a towing vehicle and on a towed vehicle comprises a vacuum capture mechanism for capturing vacuum from a towing vehicle. A vacuum delivery mechanism is provided for delivering vacuum to a towed vehicle. A switch mechanism is also provided for allowing controlled transfer of vacuum to a towed vehicle. A vacuum reception mechanism is coupleable with the vacuum delivery mechanism for receipt of vacuum. An air pressure mechanism is adapted to be coupled to a towed vehicle for generating air pressure when actuated. A ram mechanism is coupled to the air pressure mechanism for depressing a brake pedal of a towed vehicle when the air pressure mechanism is actuated. A vacuum switch mechanism is coupled to the vacuum reception mechanism. The vacuum switch mechanism has one orientation for actuating the air pressure mechanism upon receipt of vacuum. A check valve switch mechanism is coupled to the vacuum switch mechanism and adapted to be coupled to a brake vacuum system of a towed vehicle for receipt of vacuum therefrom.

The prior art teaches remote braking devices that use vacuum cylinders actuated by air pressure. The prior art also teaches the use of vacuum from a towing-vehicle to power the power boost of a towed vehicle. However, the prior art does not teach the use of vacuum to actuate the vacuum cylinder. It is worth noting that even Hargrove, which represents the state of the art in vacuum usage, never thought to use vacuum to actuate the remote braking device. This usage represents a great breakthrough in the industry.

As a further improvement, while the prior art devices are all positioned within the cab of the towed vehicle and press down directly on the brake pedal, this device utilizes a unique connection means that allows the braking device to be located anywhere on the vehicle. This connection means allows the braking device to be installed, preferably, under the hood of the towed vehicle. This placement produces a host of advantages, especially allowing the braking device to be installed permanently without taking up space inside the passenger compartment of the vehicle. These novel elements lead to a dramatically improved device and provide further related advantages as described in the following summary.

SUMMARY OF THE INVENTION

The present invention teaches certain benefits in construction and use that give rise to the objectives described below.

The present invention provides a remote braking apparatus, preferably for use in connection with a towing-vehicle and a towed-vehicle. A vacuum source, either a remote vacuum source on the towing-vehicle or an on board vacuum source on the towed-vehicle, is used to generate a vacuum in a vacuum conduit network. The vacuum conduit network is operably connected to a vacuum actuated servo mechanism. The vacuum actuated servo mechanism is actuated by the vacuum as directed by an electronic control means, the vacuum actuating the vacuum actuated servo mechanism to move between a resting position and a braking position. Movement of the vacuum actuated servo mechanism depresses the brake pedal of the towed-vehicle, preferably through a mechanical interconnection of a connection means. The connection means preferably has a first and second anchor point connected by a cable shield tube, allowing the vacuum actuated servo mechanism to control the movement of the brake pedal arm regardless of where the vacuum actuated servo mechanism is installed on the vehicle.

A primary objective of the present invention is to provide a remote braking device that uses vacuum to actuate the brakes of the vehicle. Vacuum is an excellent means of actuating a brake because it provides a rapid response but it does not jerk the brake and cause the brake to lock up the wheels of the vehicle. Vacuum, by its very nature, is a perfect trigger for a braking system because it pulls softly at first, and then builds up to a strong pull. Air pressure, as used in the prior art, is a hostile force that does not provide the gradual buildup of force as does vacuum.

Another objective is to provide a remote braking device that actuates the brakes without requiring a great deal of pressure on the brake pedal. By supplying vacuum to activate the power boost of the towed-vehicle, the brakes of the towed-vehicle are boosted so only modest pressure is required to activate the brakes. Prior art devices, on the other hand, generally do not receive the assistance of the power boost, so great force is required to activate the brakes. Repeated application of this great pressure risks serious damage to the brake pedal and the firewall of the towed-vehicle.

Another objective is to provide a device that has a connection means between the vacuum actuated servo mechanism and the brake pedal arm in which all of the stresses of actuation are self contained within the connection means, thereby allowing the vacuum actuated servo mechanism to be installed anywhere on the vehicle, either under the hood of the vehicle or within the passenger compartment.

Another objective is to provide a device that actuates the brakes by pulling the existing brake pedal without requiring the user to cut into the existing brake lines.

Another objective is to connect the device to the vehicle's vacuum supply so that the invention is powered even when the device is not attached to a towing-vehicle.

This combination of features gives rise to a host of critical advantages over the prior art. This configuration allows the device to operate either when the vehicle is under tow by a towing-vehicle or when the vehicle is operated under its own power. This is a critical breakthrough. Not only does this configuration allow ease of use while the vehicle is being towed, it also allows remote application of the brakes when the vehicle operates under its own power. This makes the device useful as an anti-theft device. It is also useful for handicapped drivers who cannot operate traditional pedal operated brakes.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
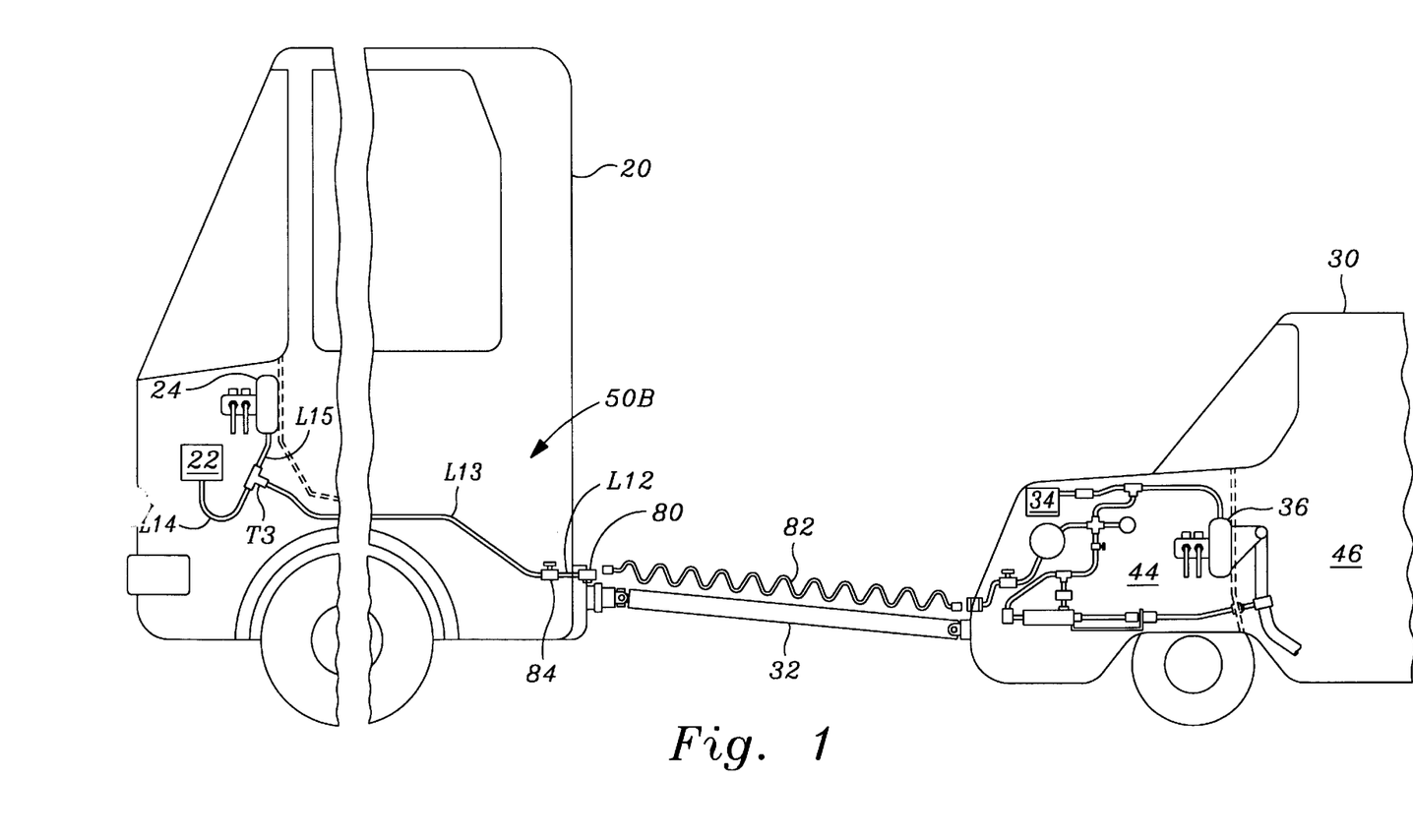
FIG. 1 is a side elevational view of a towing-vehicle towing a towed-vehicle, the vehicles having a preferred embodiment of the present invention installed therein, the vehicles being partially cut away for clearly demonstrating the invention.
Figure 2:
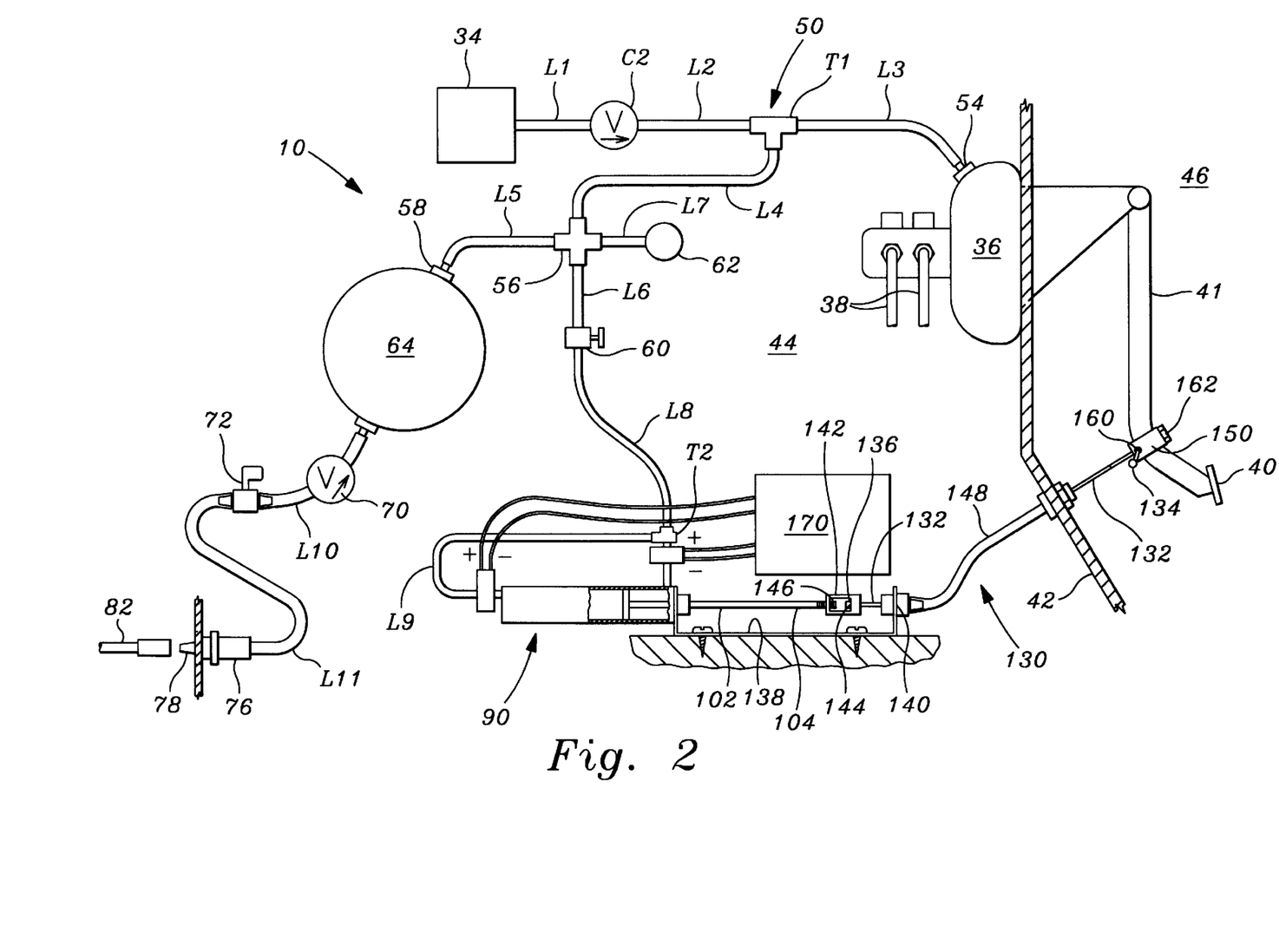
FIG. 2 is a side elevational view thereof, showing a close-up of the invention installed in the towed-vehicle.

The above-described drawing figures illustrate the invention, a remote braking apparatus 10 used to brake a vehicle 30. The remote braking apparatus 10 is preferably for use on a towed-vehicle 30 in connection with a towing-vehicle 20. The towing-vehicle 20 includes a remote vacuum source 22, preferably a vacuum generator such as an engine manifold powered by an engine in the towing-vehicle 20. The remote vacuum source 22 is preferably used to power a power boost 24 of the towing-vehicle 20, as well as a power boost 36 of the towed-vehicle 20 and the remote braking apparatus 10. It is important to note that although the preferred embodiment of the invention calls for the remote vacuum source 22 to be attached to the power boost 36, this is not essential for the function of the invention. Although is preferred that the power boost be active, some vehicles utilize hydro boosts that are not powered by vacuum. These hydro boosts can be activated by an auxiliary hydraulic pumps. When the towed-vehicle 30 is attached to the towing-vehicle 20, preferably with a tow bar 32, the apparatus utilizes vacuum from the towing-vehicle 20, to trigger the brake of the towed-vehicle 30 in response to a signal from the towing-vehicle 20, as described below. The remote vacuum source 22 is generally preferred because many towing vehicles such as RVs already have the necessary vacuum generator installed—the user only has to modify the original vacuum conduit to accommodate the remote braking apparatus 10.

In an alternative mode, also described below, the braking apparatus 10 is actuated by vacuum generated by an onboard vacuum source 34 in the towed-vehicle 30. The onboard vacuum source 34 in the towed-vehicle 30 also powers a power boost 36 in the towed-vehicle 30. In response to a signal, the remote braking apparatus 10 trigger the brake and the power boost 36. Throughout this application, the towed-vehicle 30 is sometimes referred to simply as a "vehicle" because the invention has utility apart from use as a towing accessory. The brakes are actuated by a power boost 36 through a pair of brake lines 38 in response to the movement of a brake pedal 40. The above-listed elements are already present on most vehicles. This alternative mode allows the remote braking apparatus 10 to function on any vehicle as an anti-theft device or a braking mechanism for the handicapped, and many other special uses can be envisioned for this technology. The unique structure of the apparatus allows the user to easily switch between modes if desired, although a commercial embodiment of the invention is not required to include the equipment necessary to perform in both modes.

In the preferred embodiment, the remote braking apparatus comprises the following primary elements: a vacuum conduit network 50, a vacuum actuated servo mechanism 90 having a vacuum control means 110, an electronic control means 170, and a connection means 130. These elements are described in greater detail in the following discussion, with reference to the described drawings.

As shown in FIGS. 1 and 2, the vacuum conduit network 50 supplies vacuum to the vacuum control means 110 portion of the vacuum actuated servo mechanism 90. The vacuum conduit network 50 operably connects the remote vacuum source 22 of the towing-vehicle 20 and the onboard vacuum source 34 of the towed-vehicle 30 to the power boost 36 of the towed-vehicle 30 and the vacuum control means 110. Although it is not technically correct to refer to vacuum as a positive element, since it is actually the lack of air pressure, for simplicity we will refer to vacuum as a positive element that can be transferred throughout the system. The vacuum conduit network 50 is structured so that either the remote vacuum source 22 of the towing-vehicle 20 or the onboard vacuum source 34 of the towed-vehicle 30 can be used to supply vacuum to both the vacuum control means 110 and the power boost 36 of the towed-vehicle 30. The vacuum conduit network 50 must have a towed-vehicle conduit network 50A, and in its preferred mode the vacuum conduit network 50 also includes a towing-vehicle conduit network 50B. In its preferred embodiment, the vacuum conduit network 50 comprises sixteen sections of vacuum conduit, hereinafter referred to as L1–L16.

The towed-vehicle conduit network 50A, as shown in FIG. 2, connects the vehicle's onboard vacuum source 34 to the power boost 36 of the vehicle 30 with three sections of vacuum conduit L1, L2, and L3. The onboard vacuum source 34, usually the vehicle's manifold, generates a vacuum which is transmitted to a first check valve C1 through vacuum conduit L1. The vacuum is then transmitted to a three-way conduit connector T1 through vacuum conduit L2. Three-way conduit connector T1 is connected to an inlet port 54 of the power boost 36 through vacuum conduit L3. Three-way conduit connector T1 is also connected to a four-way conduit connector 56 through vacuum conduit L4. The four-way conduit connector 56 is connected to the following: an outlet port 58 of a vacuum reservoir 64 by vacuum conduit L5, a throttle valve 60 by vacuum conduit L6, and a vacuum gauge 62 by vacuum conduit L7. Neither the vacuum gauge 62 nor the vacuum reservoir 64 is essential for operation; however, both elements are useful and are included in the best mode of this invention. The vacuum gauge 62 allows the user to visually inspect whether the vacuum conduit network 50 is receiving vacuum. The vacuum reservoir 64, a rigid and airtight canister preferably made of steel or plastic, is highly desirable because it provides a ready supply of vacuum to provide a quicker brake response. A vacuum reservoir 64 is also important in breakaway situations, as described more fully below. The throttle valve 60, sometimes known as a needle valve, allows the user to regulate the amount of vacuum transmitted through the vacuum conduit network 50 to the vacuum control means 110. The throttle valve 60 is important because it allows the brakes to be applied in a controlled manner. The throttle valve 60 is connected to the vacuum control means 110 by vacuum conduit L8. When the braking apparatus 10 only has the towed-vehicle conduit network 50A, the apparatus is operable only when the vehicle is operating under its own power. This configuration is useful for braking a vehicle used by a handicapped person who cannot press a traditional brake pedal. It is also useful as an anti-theft device, causing the brakes to activate if the car is started and a special "kill switch" is not deactivated.

In a preferred embodiment, the vacuum conduit network 50 further includes a towing-vehicle conduit network 50B. The towing-vehicle conduit network 50B, as shown in FIG. 1, includes elements necessary to include the vacuum-source of the towing-vehicle 20 in the vacuum conduit network 50. An input check valve 70 of the vacuum reservoir 64 is connected to a first ball valve 72 by a vacuum conduit L10. The input check valve 70 regulates the flow of vacuum so that vacuum from the towing-vehicle 20 can enter the reservoir when the vehicle is under tow, but vacuum from the vacuum conduit network 50 does not escape when the onboard vacuum source 34 of the vehicle supplies the vacuum. The first ball valve 72 provides the user with a mechanism to close the towed-vehicle conduit network 50A when the towing-vehicle conduit network 50B is not attached to a towed-vehicle conduit network 50A. This arrangement allows this preferred embodiment to function similar to the alternative embodiment described above when the invention is not connected to a towing-vehicle 20. The first ball valve 72 is connected to a towed-vehicle bulkhead connector 76 by a vacuum conduit L11. The towed-vehicle bulkhead connector 76 is a rigid, externally threaded adapter that threadedly engages an aperture in the vehicle 30, preferably in the front of the towed-vehicle 30. The towed-vehicle bulkhead connector 76 has a vacuum hose accepting portion 78. The towed-vehicle bulkhead connector 76 provides both a means of connecting the vacuum hose 82 to the vacuum conduit L12 and a conduit for the vacuum through the exterior of the vehicle. As shown in FIG. 1, the vacuum hose accepting portion 78 of the towed-vehicle bulkhead connector 76 is connected to a similar towing-vehicle bulkhead connector 80 by a length of flexible vacuum hose 82. The towing-vehicle bulkhead connector 80 is preferably mounted on the rear of the towing-vehicle 20. The vacuum hose 82 is preferably an inelastic plastic tube that is durable enough to withstand use on the road between two vehicles. The towing-vehicle bulkhead connector 80 is connected to a second ball valve 84 by a vacuum conduit L12. The second ball valve 84 is connected, most preferably, to a three-way conduit connector T3, by a vacuum conduit L13. In the most preferred embodiment, the three-way conduit connector T3 is connected to the remote vacuum source 22 of the towing-vehicle 20 by vacuum conduit L14 and to the power boost 24 of the towing-vehicle 20 by vacuum conduit L15. This most preferred embodiment is used when the towing-vehicle 20 draws vacuum from a manifold and transmits the vacuum to a power boost 24. In an alternative embodiment, vacuum conduit L13 is connected to some other vacuum source, such as a portable onboard vacuum source 34 or a vacuum canister carried aboard the towing-vehicle 20. The source of this external vacuum source is not important to the novelty of this invention. Many other configurations are possible, including a portable vacuum canister that can be carried aboard the towed-vehicle 30.

The vacuum actuated servo mechanism 90 that receives vacuum from the vacuum control means 110 as directed by an electronic control means 170. The user triggers the remote braking device 10 with the electronic control means 170, which causes the vacuum control means 110 to direct vacuum from the vacuum conduit network 50 to actuate the vacuum actuated servo mechanism 90, causing the vacuum actuated servo mechanism 90 to move from a resting position to a braking position. The novelty of this invention is in the use of vacuum not only to power the power boost 36 of the towed-vehicle 30 but also to actuate the vacuum actuated servo mechanism 90.

Figure 3:
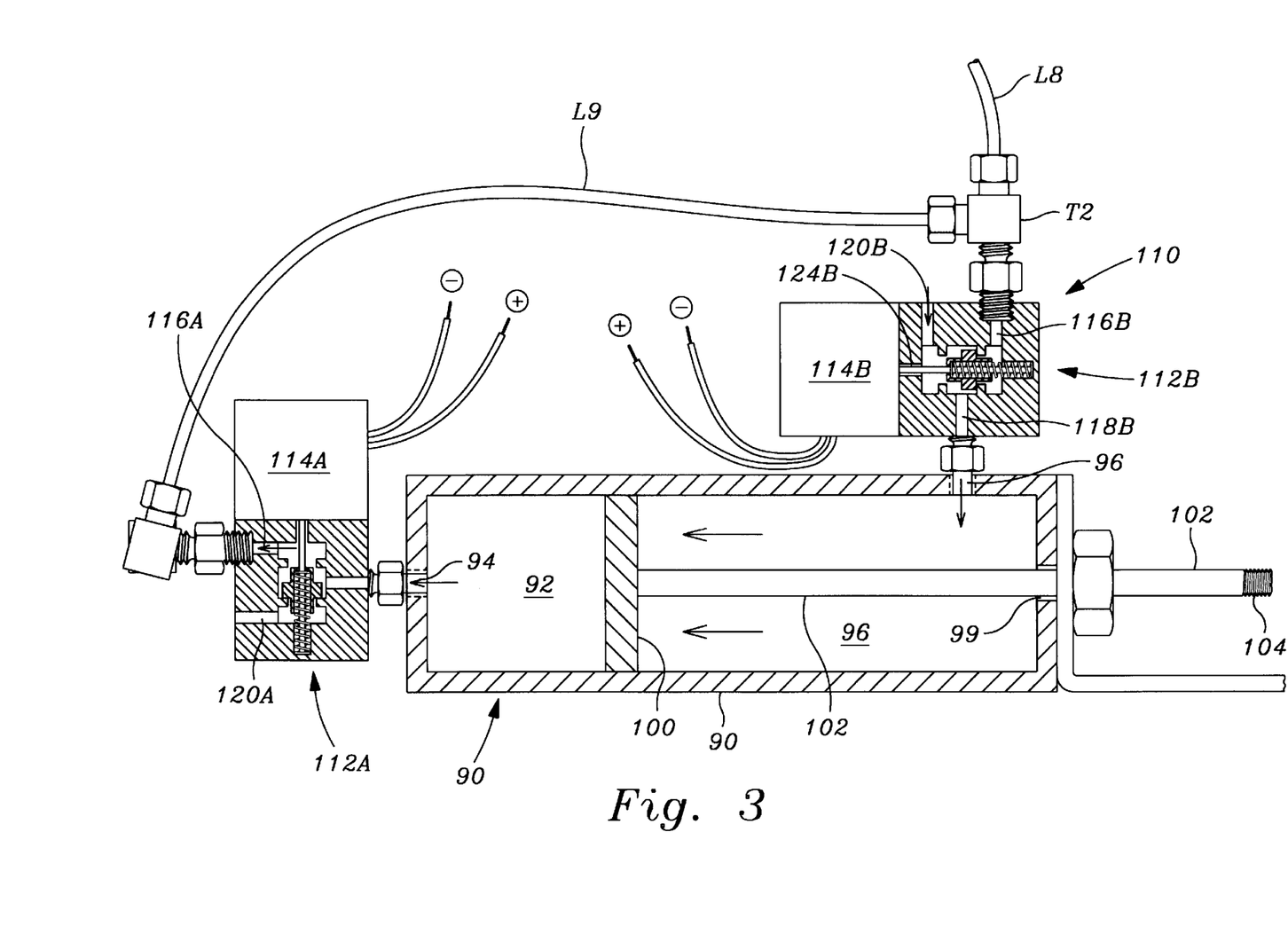
FIG. 3 is a side elevational cross sectional view of a vacuum cylinder showing two solenoids in a braking configuration.
Figure 4:
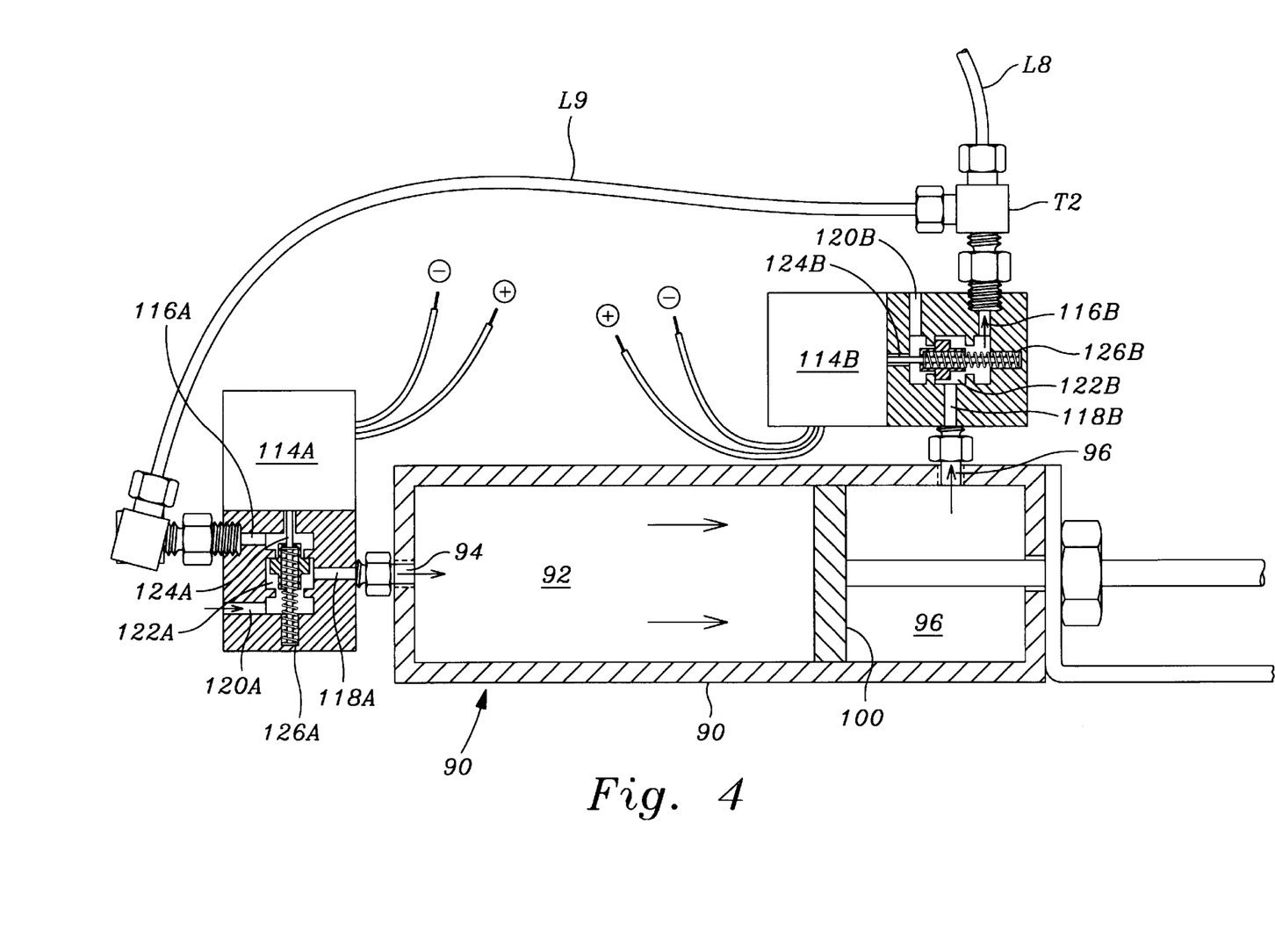
FIG. 4 is a side elevational cross sectional view of a vacuum cylinder showing two solenoids in a resting configuration.

In its preferred embodiment, as shown in FIGS. 3 and 4, the vacuum actuated servo mechanism 90 is a vacuum cylinder. The vacuum cylinder 90 is a rigid container, preferably made of metal or plastic, preferably having a diameter of 2 inches. Those skilled in the art will be capable of selecting different cylinder sizes based upon the specific requirements of the individual system. If a greater amount of pull is necessary, a larger diameter vacuum cylinder 90 can be used. The vacuum cylinder 90 includes a plunger 100 that fits within the vacuum cylinder 90 and forms an airtight seal within the vacuum cylinder 90, separating the vacuum cylinder 90 into a first and second chamber 92 and 96. The vacuum cylinder 90 has a first aperture 94 and a second aperture 98, the first aperture 94 communicating with the first chamber 92 and the second aperture 98 communicating with the second chamber 96. A piston rod 102 has a plunger 100 attached to one end and an externally threaded section 104 at the other end. A piston rod conduit 99 is located opposite the first solenoid valve and coaxial with the vacuum cylinder 90. The piston rod 102 is slidably mounted within the piston rod conduit 99 through the vacuum cylinder 90. The piston rod conduit 99 is designed so that the piston rod 102 can freely slide back and forth within the piston rod conduit 99, but air cannot leak into the vacuum cylinder 90 through the piston rod conduit 99.

In the preferred embodiment, as shown in FIGS. 3 and 4, the vacuum control means 110 consists of a first solenoid valve 112A and a second solenoid valve 112B, both operably connected to the vacuum conduit L8. In its preferred mode, the vacuum conduit L8 is connected to a three-way conduit connector T2. As shown in FIGS. 3 and 4, the first and second solenoid valves 112A and 112B each contain a solenoid 114A and 114B, an input conduit 116A and 116B, an output conduit 118A and 118B, and an exhaust conduit 120A and 120B. All three conduits lead to a central chamber 122A and 122B within the solenoid valve 112A and 112B, where a central push rod 124A and 124B directs air/vacuum flow. The three-way conduit connector T2 is connected to the input conduit 116A of a first solenoid valve 112A by vacuum conduit L9. In its preferred mode, the three-way conduit connector T2 is a rigid fitting that is directly connected to the input conduit 116A of a first solenoid valve 112A; however, in alternative embodiments, the two are connected by a vacuum conduit. The three-way conduit connector T2 is also connected to an input conduit 116B of a second solenoid valve 112B. The output conduits 118A and 118B of the first and second solenoid valves 112A and 112B are operably connected to the first and second apertures 94 and 98, allowing the output conduits 118A and 118B of the first and second solenoid valves 112A and 112B to communicate with the first and second chambers 92 and 96. In each of the solenoid valves 112A and 112B, the central push rod 124A and 124B is biased towards a resting position by a spring 126A and 126B. In response to the electronic control means 170, as shown in FIG. 3, the solenoids 114A and 114B are energized and push the central push rods 124A and 124B to an activated position.

In the resting position, as shown in FIG. 4, the springs 126A and 126B bias the central push rods 124A and 124B to their resting position. In this resting position, the central push rod 124A of the first solenoid valve 112A is positioned to cover the input conduit 116A, allowing the exhaust conduit 120A of the first solenoid valve 112A to communicate with the output conduit 118A, thereby allowing air at atmospheric pressure to enter the first chamber 92. In the second solenoid valve 112B, the spring 126B biases the central push rod 124B to cover the exhaust conduit 120B, allowing the input conduit 116B to communicate with the second chamber 96, thereby allowing the vacuum from the vacuum conduit network to remove the air from the second chamber 96. The combination of the air at atmospheric pressure in the first chamber 92 and the vacuum in the second chamber 96 holds the plunger 100 and the piston rod 102 in the resting position.

In the activated position, as shown in FIG. 3, the energized solenoids 114A and 114B overcome the bias of the springs 126A and 126B and push the central push rods 124A and 124B to their activated positions. In the first solenoid valve 112A, the central push rod 124A moves to cover the exhaust conduit 120A, allowing the input conduit 116A of the first solenoid valve 112A to communicate with the output conduit 118A, thereby allowing vacuum from the vacuum conduit network 50 to remove all air from the first chamber 92, creating a vacuum within the first chamber 92. In the activated position, the central push rod 124B of the second solenoid valve 112B is positioned to cover the input conduit 116B, allowing the exhaust conduit 120B to communicate with the output conduit 118B, thereby allowing air at atmospheric pressure into the second chamber 96. The combination of the vacuum in the first chamber 92 and the air at atmospheric pressure in the second chamber 96 causes the plunger 100 to move towards the first chamber 92, pulling the piston rod 102 inwards to a braking position.

An alternative embodiment of the vacuum actuated servo mechanism 90 includes the use of a return spring, rather than the second solenoid valve, to bias the plunger 100 in the resting position within the vacuum cylinder 90. The first solenoid valve would introduce vacuum to the first chamber 92, thereby pulling in the plunger 100 against the bias of the return spring. This alternative requires a larger vacuum cylinder 90 because a stronger vacuum is required to overcome the resistance of the spring, but it has the advantage of using one less solenoid valve. It is important to note that the important novelty of this invention is the use of vacuum to actuate the brake pedal 40, not the particular mechanism used to accomplish this task. While the above described vacuum cylinder 90 with two solenoid valves is the preferred means of actuating the brake pedal 40, those skilled in the art can devise many similar structures to accomplish the same task, and these structures should be considered equivalent to this embodiment and within the scope of the below described claims.

As shown in FIG. 2, a connection means 130 mechanically interconnects the vacuum actuated servo mechanism 90 to the brake pedal 40 of the towed-vehicle 30. In its preferred embodiment, the connection means 130 includes a cable 132, a cable mounting bracket 138, a rod/cable clip 142, a cable shield tube 148, and a brake pedal bracket 150. The cable 132, preferably a flexible steel cable, has a first cable end having an anchor bulb 134 and a second cable end 136. The cable 132 is threaded through a clip hole 144 in a rod/cable clip 142 and locked into place, preferably with a cable stop, to prevent the cable 132 from disengaging the rod/cable clip 142. An internally threaded rod receiving section 146 of the rod/cable clip 142 is then threadedly engaged to the threaded end of the piston rod 102 to firmly connect the cable 132 to the piston rod 102. By rotating the internally threaded rod/cable clip 142 with respect to the externally threaded piston rod 102, the rod/cable clip 142 threadedly moves up or down the length of the piston rod 102, adjusting the overall length of the connection means 130, thereby removing any slack from the cable 132. The cable mounting bracket 138 is preferably a rigid cradle shaped arm that is slightly longer than the piston rod 102. The cable shield tube 148 is preferably a flexible but inelastic and incompressible tube such as a brake line. The cable mounting bracket 138 extends from the vacuum cylinder 90 to form a first anchor point 140. The cable shield tube 148 is attached to the first anchor point 140, positioning the end of the cable shield tube 148 near the end of the piston rod 102 so that the cable shield tube 148 is roughly coaxial with the piston rod 102 and the vacuum cylinder 90. The other end of the cable shield tube 148 is anchored to a second anchor point on the vehicle, preferably at the firewall 42 of the vehicle. It is important to note that the novelty of the connection means 130 lies in the use of the cable shield tube 148 with two mounting points, the first mounting point being at the cable mounting bracket 138 and the second mounting point 151 being to the vehicle itself. This configuration allows the braking device to pull the brake pedal 40 without regard to where the vacuum cylinder 90 is actually installed, with all of the tension on the cable 132 being self contained within the cable shield tube 148 and the cable mounting bracket 138.

In its preferred embodiment, the second mounting point 151 is an externally threaded anchor bolt 152 mounted on the vehicle through a hole in the firewall 42. In this embodiment, the vacuum cylinder 90 is mounted in an engine compartment 44 of the vehicle. The anchor bolt 152 has a coaxial conduit large enough for the cable 132 to fit through running down the length of the anchor bolt 152. The anchor bolt 152 is fitted through the hole in the firewall 42 and secured in place with an internally threaded anchor nut 154 that threadedly engages the anchor bolt 152 in the other side of the firewall 42. The cable shield tube 148 is securely engaged to the anchor bolt 152 with a cable shield tube adapter 156 so that the cable shield tube 148 is coaxial with the conduit of the anchor bolt 152. The cable 132 runs through the cable shield tube 148 to the firewall 42 of the vehicle, where it passes through the firewall 42 by passing through the coaxial conduit of the anchor bolt 152, and into the passenger compartment 46 of the towed-vehicle 30. The cable 132 passes through a locking hole 160 in the brake pedal bracket 150, and the anchor bulb 134 locks the cable 132 into place, the anchor bulb 134 being larger than the locking hole 160. The brake pedal bracket 150, preferably a pair of metal brackets that are attached to either side of the brake pedal 40, or the brake pedal arm 41, and locked into place with a pair of locking bolts 162. When the device is used as an anti-theft device, the brake pedal bracket 150 is designed to semi-permanently engage the brake pedal 40 so a thief cannot defeat the device by easily disconnecting the cable 132 from the brake pedal 40.

In an alternative embodiment, the second mounting point is an L-bracket and a pulley, both fastened to the firewall 42 near the brake pedal arm 41. In this embodiment, the vacuum cylinder 90 is installed in a passenger compartment 46 of the vehicle. The cable shield tube 148 is attached to the L-bracket so that the cable shield tube 148 is firmly anchored in place. The cable 132 passes out of the cable shield tube 148 and around the pulley for attachment to the brake pedal bracket 150. The innovative use of two anchor points with an intervening cable shield tube 148 makes it irrelevant where the vacuum cylinder 90 is actually located, as long as the cable shield tube 148 can be fastened at the second anchor point near the brake pedal 40. This is a great advantage over prior art patents, which could generally only be located in a very particular location in the passenger compartment 46 of the vehicle. The present invention can be installed almost anywhere the individual user may desire. In the alternative embodiment, a hole must still be provided through the firewall 42 so the vacuum conduit L7 or L8 can connect the vacuum cylinder 90 with the rest of the vacuum conduit network 50. Any other elements, such as the electronic control means 170 described below, are also preferably passed through the hole in the firewall 42.

Figure 5:
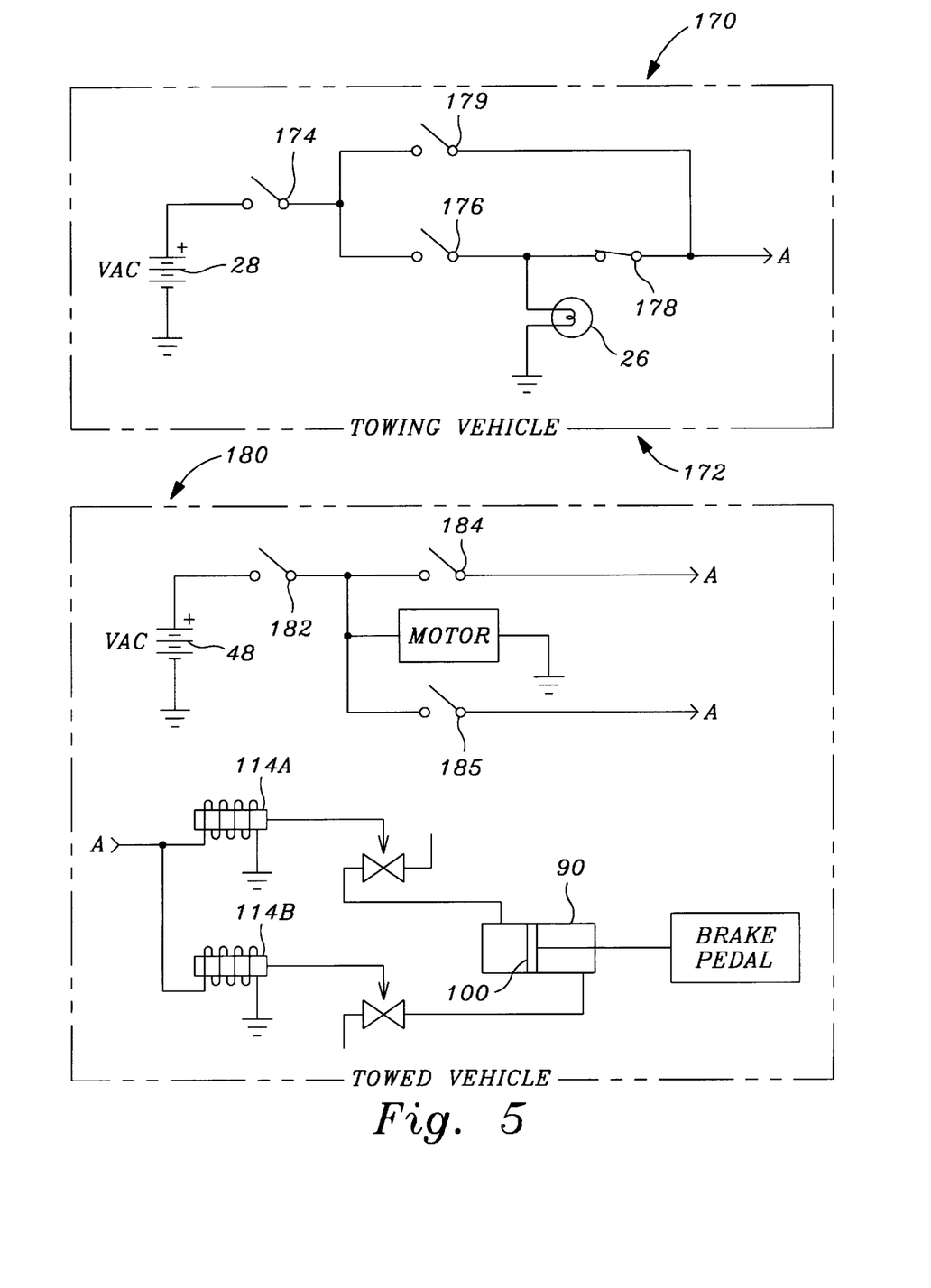
FIG. 5 is a electrical schematic of an electronic control circuit, demonstrating how various switches electronically actuate the two solenoids to control a brake pedal of the towed-vehicle.

The electronic control means 170 is preferably a circuit that connects the solenoids 114A and 114B to a power supply when the user wants to brake the vehicle 30. The specific elements of the circuit will vary depending upon the specific use that the user has for the remote braking apparatus 10. By adding several different switches, the user can have many alternative methods of braking the vehicle 30. A preferred embodiment, having several switches, is shown in FIG. 5. This embodiment includes both a towing-vehicle circuit 172 and a towed-vehicle circuit 180, both electronically connected to the solenoids 114A and 114B for activating the remote braking apparatus 10.

The towing-vehicle circuit 172 utilizes the towing-vehicle battery 28 as a power source and provides a circuit between the solenoids 114A and 114B and the towing-vehicle's battery 28. The connection can be completed with either of two switches, both dependent upon the first activation of the towing-vehicle ignition switch 174. The first switch is a foot switch 176 that already connects to the towing-vehicle's brake lights 26. When the foot switch 176 is activated, the brake lights 26 are energized and the solenoids 114A and 114B are activated. This circuit is potentially broken by a braking kill switch 178, which is controlled by a switch preferably located on the dashboard of the towing-vehicle 20. A second switch, a dashboard switch 179 capable of energizing the solenoids 114A and 114B, provides for push-button braking. Whenever the towing-vehicle ignition switch 174 is turned on and the dashboard switch 179 is pressed, the circuit is completed and the power source is connected to the solenoids 114A and 114B, thereby electrifying the solenoids 114A and 114B and causing the braking device to brake the towed-vehicle 30.

The preferred electronic control means 170 further includes the towed-vehicle circuit 180. The towed-vehicle circuit 180 utilizes a towed-vehicle battery 48 as a power source and preferably includes both a towed-vehicle ignition switch 182 and an anti-theft kill switch 184. The anti-theft kill switch 184 is preferably positioned to complete the circuit between the towed-vehicle battery 48 and the solenoids 114A and 114B upon turning the switch. When the switch is activated and the towed-vehicle ignition switch 182 is turned on, the solenoids 114A and 114B are energized. If an unauthorized user turns on the car without turning off the anti-theft kill switch 184, the vehicle's onboard vacuum source 34 will generate vacuum once the engine is running, and the energized solenoids 114A and 114B will direct the vacuum to the vacuum cylinder 90, thereby causing the brakes of the vehicle to activate, preventing theft of the vehicle. The towed-vehicle circuit 180 preferably includes a push-button switch 186 in which the user completes the circuit and activates the brakes with the push of a button, the button usually being mounted near the steering wheel. This "push button braking" is useful for the handicapped, who often cannot use ordinary foot-actuated braking. This also provides the user with a simple method of testing the invention to make sure it is functioning correctly. The towed-vehicle circuit 180 preferably further includes a monitoring circuit that electronically connects the brake light circuit of the towed-vehicle with an indicator light in the towing-vehicle. The indicator light is preferably mounted on the dash board and visually alerts the driver that the towed-vehicle's brakes have been applied.

In alternative embodiments not shown, the switch is controlled by a signal transmitting means transmits a wave signal to a receiving means in the towed-vehicle. The receiving means, in response to the signal, controls the switch and activates the brakes. This remote actuated braking allows someone who is not even inside the vehicle or a towing-vehicle to operate the brakes with the push of a button. Other alternative switch embodiments include the following: a heat sensor that will automatically deactivate the braking device if the brakes overheat; a switch such as is described in Avery et al., U.S. Pat. No. 5,213,396, herein incorporated by reference, that triggers the brakes whenever the tow hitch is under stress from braking; a breakaway switch that is activated by a switch that is closed whenever the towed-vehicle breaks away from the towing-vehicle; and a remote signaling device that sends a signal to a sensor on the towed-vehicle and causes the brakes to activate upon receipt of the signal. Obviously, many different triggering devices can be devised by those skilled in the art. These potential triggering devices, within the capability of those skilled in the art to devise, and the various circuits they require, are all within the scope of this invention and should be considered equivalent.

In operation, the remote braking apparatus 10 operates either when the vehicle 30 is operating under its own power or when it is being towed by a towing-vehicle 20. When the vehicle is operating under its own power, the onboard vacuum source 34 of the vehicle 30, usually the manifold, creates a vacuum throughout the vacuum conduit network 50. When the vehicle 30 is being towed, vacuum conduit is used to connect the remote vacuum source 22 of the towing-vehicle 20 to the vacuum conduit network 50, creating a vacuum throughout the vacuum conduit network 50. While the vacuum control means 110 is in its resting configuration, the vacuum actuated servo mechanism 90 and the connection means 130 allow the brake pedal 40 to remain in a resting position and the brakes of the vehicle remain inactive. In response to a signal from the electronic control means 170, the vacuum control means 110 directs vacuum from the vacuum conduit network 50 into the vacuum actuated servo mechanism 90, causing the vacuum actuated servo mechanism 90 to move from the resting position to the braking position, pulling the brake pedal 40 through the connection means 130 and thereby applying the brakes of the vehicle.

This invention further includes the method of braking a towed vehicle using the above-described device. The method comprising the steps of providing a towing-vehicle 20 having a remote vacuum source 22; providing a towed-vehicle 30 having an engine compartment 44 and a passenger compartment 46, the engine and passenger compartments 44 and 46 being separated by a firewall 42, the engine compartment 44 having an onboard vacuum source 34 and brakes actuated by a power boost 36 in response to the movement of a brake pedal 40; providing a vacuum control means 110 operable attached to a vacuum actuated servo mechanism 90; installing the vacuum control means 110 and the vacuum actuated servo mechanism 90 within the engine compartment 44 of the towed-vehicle 30; creating a vacuum conduit network 50 by connecting the remote vacuum source 22 of the towing-vehicle 20 and the onboard vacuum source 34 of the towed-vehicle 30 to the power boost 36 of the towed-vehicle 30 and a vacuum control means 110; providing an electronic control means 170; operably connecting the electronic control means 170 to the vacuum control means 110; providing a connection means 130; drilling a hole through the firewall 42 of the towed-vehicle 30 and inserting the connection means 130 through the hole; mechanically interconnecting the vacuum actuated servo mechanism 90 to the brake pedal 40 of the towed-vehicle 30 with the connection means 130; triggering the electronic control means 170 to switch the vacuum control means 110 from a resting position to a braking position, causing the vacuum control means 110 to change the flow of vacuum from the vacuum conduit network 50 to actuate the vacuum actuated servo mechanism 90 such that it moves from a resting position to a braking position, pulling down the brake pedal 40 of the towed-vehicle 30 and causing the towed-vehicle 30 to brake.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A remote braking apparatus comprising:

a towing-vehicle having a remote vacuum source;

a towed-vehicle having a manifold that creates a vacuum when the towed-vehicle is operating under its own power, the towed vehicle further having brakes assisted by a power boost in response to the movement of a brake pedal;

a vacuum conduit network that operably connects the remote vacuum source of the towing-vehicle and the onboard vacuum source of the towed-vehicle to the power boost of the towed-vehicle and a vacuum control means of the towed-vehicle;

a vacuum actuated servo mechanism that receives vacuum from the vacuum control means as directed by an electronic control means, the vacuum actuating the vacuum actuated servo mechanism to move between a resting position and a braking position; and a connection means mechanically interconnecting the vacuum actuated servo mechanism and the brake pedal of the towed-vehicle, whereby, in response to a signal from the electronic control means, the vacuum control means directs vacuum, generated by either the remote vacuum source of the towing-vehicle or the onboard vacuum source of the towed-vehicle, into the vacuum actuated servo mechanism, causing the vacuum actuated servo mechanism to move from the resting position to the braking position pulling the brake pedal and applying the brakes of the towed-vehicle.

2. The apparatus of claim 1 wherein the vacuum actuated servo mechanism is a vacuum cylinder having a first aperture and a second aperture, and wherein the vacuum control means is a pair of solenoid valves attached to the first and second apertures, each of the pair of solenoid valves being attached to the remote vacuum source with a vacuum conduit.

3. The apparatus of claim 2 wherein the vacuum cylinder has a cylinder bracket firmly attached to the outside of the vacuum cylinder and a piston rod manipulated by the vacuum cylinder, and wherein the connection means comprises a cable, a cable shield tube, and a brake pedal bracket, the cable shield tube being attached to the cylinder bracket at a first end and a firewall of the towed-vehicle at the second end, the cable being threaded through the cable shield tube and the firewall, and being attached at one end to the piston rod and at the other end to the brake pedal bracket, the brake pedal bracket being attached to the brake pedal of the towed-vehicle.

4. The apparatus of claim 1 wherein the vacuum control means further includes a throttle valve.

5. The apparatus of claim 1 wherein the electronic control means is a switch in the towing-vehicle connected to the vacuum control means in the vehicle with a wire forming an electric connection between the switch and the vacuum control means, such that when the switch is moved to the braking position, the vacuum control means transmits vacuum to the vacuum actuated servo mechanism, causing the vehicle to brake.

6. A remote braking apparatus for actuating a brake pedal of a vehicle, the vehicle having brakes actuated by a power boost in response to the movement of the brake pedal, the apparatus comprising:

a vacuum source operably connected to a vacuum control means and the power boost of the vehicle;

a vacuum actuated servo mechanism that receives vacuum from the vacuum control means as directed by an electronic control means, the vacuum actuating the vacuum actuated servo mechanism to move between a resting position and a braking position; and a connection means mechanically interconnecting the vacuum actuated servo mechanism and the brake pedal of the vehicle, whereby the vacuum control means directs vacuum from the vacuum source into the vacuum actuated servo mechanism, causing the vacuum actuated servo mechanism to move from the resting position to the braking position, pulling the brake pedal of the vehicle via the connection means, thereby actuating the power boost, which is also connected to the vacuum source, and applying the brakes of the vehicle.

7. The apparatus of claim 6 wherein the vacuum control means further includes a throttle valve.

8. The apparatus of claim 6 wherein the vacuum source is an onboard vacuum source mounted on the vehicle and powered by the same engine that powers the vehicle, the onboard vacuum source being connected to the vacuum control means with a length of vacuum conduit.

9. The apparatus of claim 6 wherein the electronic control means is an electronic circuit having a switch, the circuit connecting the vacuum control means with a battery, such that when the switch is moved from a resting position to a braking position, the vacuum control means changes its configuration so that it transmits vacuum to the vacuum actuated servo mechanism, causing the vehicle to brake.

10. The apparatus of claim 6 wherein the vacuum actuated servo mechanism is a vacuum cylinder having a first aperture and a second aperture, and wherein the vacuum control means is a pair of solenoid valves attached to the first and second apertures, each of the pair of solenoid valves being attached to the vacuum source with a vacuum conduit.

11. The apparatus of claim 10 wherein the vacuum cylinder has a cable mounting bracket firmly attached to the outside of the vacuum cylinder and a piston rod manipulated by the vacuum cylinder, and wherein the connection means comprises a cable, a cable shield tube, and a brake pedal bracket, the cable shield tube being attached to the cylinder bracket at a first end and to the vehicle at the second end, the cable being threaded through the cable shield tube and being attached at one end to the piston rod and at the other end to the brake pedal bracket, the brake pedal bracket being attached to the brake pedal of the vehicle.

12. A method of braking a towed vehicle, the method comprising the steps of:

a) providing a towing-vehicle having a remote vacuum source;

b) providing a towed-vehicle having an engine compartment and a passenger compartment, the engine and passenger compartments being separated by a firewall, the engine compartment having an onboard vacuum source and brakes assisted by a power boost in response to the movement of a brake pedal;

c) providing a vacuum control means operable attached to a vacuum actuated servo mechanism;

d) installing the vacuum control means and the vacuum actuated servo mechanism within the engine compartment of the towed-vehicle;

e) creating a vacuum conduit network by connecting the remote vacuum source of the towing-vehicle and the onboard vacuum source of the towed-vehicle to the power boost of the towed-vehicle and a vacuum control means;

f) providing an electronic control means;

g) operably connecting the electronic control means to the vacuum control means;

h) providing a connection means;

i) drilling a hole through the firewall of the towed-vehicle and inserting the connection means through the hole;

j) mechanically interconnecting the vacuum actuated servo mechanism to the brake pedal of the towed-vehicle with the connection means;

k) triggering the electronic control means to switch the vacuum control means from a resting position to a braking position, causing the vacuum control means to change the flow of vacuum from the vacuum conduit network to actuate the vacuum actuated servo mechanism such that it moves from a resting position to a braking position, pulling down the brake pedal of the towed-vehicle and causing the towed-vehicle to brake.

13. The method of claim 12 wherein the vacuum actuated servo mechanism is a vacuum cylinder.

14. The method of claim 13 wherein the vacuum cylinder has a cylinder bracket firmly attached to the outside of the vacuum cylinder and a piston rod manipulated by the vacuum cylinder, and wherein the connection means comprises a cable, a cable shield tube, and a brake pedal bracket, the cable shield tube being attached to the cylinder bracket at a first end and a firewall of the towed-vehicle at the second end, the cable being threaded through the cable shield tube and being attached at one end to the piston rod and at the other end to the brake pedal bracket, the brake pedal bracket being attached to the brake pedal of the towed-vehicle.

* * * * *

UNITED STATES PATENT AND TRADEMARK OFFICE
CERTIFICATE OF CORRECTION

PATENT NO. : 6,152,544
DATED : November 28, 2000
INVENTOR(S) : John C. Greaves, Jr.

Page 1 of 2

It is certified that error appears in the above-identified patent and that said Letters Patent is hereby corrected as shown below:

Drawings, sheet 2, Fig. 2,
The reference numeral 50A should be applied to the towed vehicle conduit network, which generally includes vacuum conduits L1-L11.
The reference numeral C1 should be applied to the check valve incorrectly labeled C2.
The reference numeral 110 should be applied to the two soleniods ("vacuum control means") attached to the vacuum actuated servo mechanism 90. One of the solenoids is also attached to vacuum conduit L9 and the second solenoid is attached to the coupler T2.
The reference numeral 151 should be applied to the second mounting point, generally referring to the intersection of the cable shield tube 148 and the firewall 42.
The reference numeral 152 should be applied to the external threaded anchor bolt element that is positioned through the firewall 42 and receives the cable shield tube 148.
The reference numeral 154 should be applied to the internally threaded anchor nut element attached to the externally threaded anchor bolt on the right side of the firewall 42.

Drawings, sheet 3, Fig. 3,
The reference numeral 118A should be applied to the output conduit of the first vacuum control valve 112A, the output conduit communicating with the first aperture 94.
The reference numeral 98 should be applied to the second aperture element that is incorrectly labeled 96.

Drawings, sheet 4, Fig. 4,
The reference numeral 98 should be applied to the second aperture element that is incorrectly labeled 96.

Drawings, sheet 5, Fig. 5,
The reference numeral 186 should be applied to the push button switch that is incorrectly labeled 185.

Column 7,
Line 13, delete "that".

UNITED STATES PATENT AND TRADEMARK OFFICE
CERTIFICATE OF CORRECTION

| | |
|---|---|
| PATENT NO. : 6,152,544 | |
| DATED : November 28, 2000 | |
| INVENTOR(S) : John C. Greaves, Jr. | |

It is certified that error appears in the above-identified patent and that said Letters Patent is hereby corrected as shown below:

Column 9,
Line 57, replace "156" with -- not shown --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*